(12) United States Patent
Seo

(10) Patent No.: US 12,545,057 B2
(45) Date of Patent: Feb. 10, 2026

(54) NOISE-REDUCING TIRE

(71) Applicant: HANKOOK TIRE & TECHNOLOGY CO., LTD., Seongnam-si (KR)

(72) Inventor: Jong Hoon Seo, Daejeon (KR)

(73) Assignee: HANKOOK TIRE & TECHNOLOGY CO., LTD., Seongnam-si (KR)

(\*) Notice: Subject to any disclaimer, the term of this patent is extended or adjusted under 35 U.S.C. 154(b) by 0 days.

(21) Appl. No.: 18/473,865

(22) Filed: Sep. 25, 2023

(65) Prior Publication Data
US 2024/0109375 A1   Apr. 4, 2024

(30) Foreign Application Priority Data

Sep. 29, 2022 (KR) .................. 10-2022-0124172

(51) Int. Cl.
*B60C 11/03* (2006.01)
*B60C 11/13* (2006.01)

(52) U.S. Cl.
CPC ... *B60C 11/1369* (2013.01); *B60C 2011/0365* (2013.01); *B60C 2011/0369* (2013.01)

(58) Field of Classification Search
CPC ..... B60C 2011/0365; B60C 2011/0376; B60C 11/1369
See application file for complete search history.

(56) References Cited

U.S. PATENT DOCUMENTS

| 2013/0192731 | A1  | 8/2013 | Oji |
| 2015/0090383 | A1* | 4/2015 | Lepisto ............... B60C 11/0306 152/209.18 |
| 2023/0202240 | A1* | 6/2023 | Nishiwaki ........... B60C 11/1236 152/209.1 |

FOREIGN PATENT DOCUMENTS

| JP | H08290707 A | * 11/1996 | ......... B60C 11/0309 |
| JP | 2019-529230 A | 10/2019 | |

OTHER PUBLICATIONS

JP H08-290707 Machine Translation, Uemura, Yoshiaki (Year: 1996).*

\* cited by examiner

*Primary Examiner* — Justin R Fischer
*Assistant Examiner* — Nicholas J Weiler
(74) *Attorney, Agent, or Firm* — Bridgeway IP Law Group, PLLC; Jihun Kim

(57) ABSTRACT

In order to reduce noise energy, an embodiment provides a noise-reducing tire including lateral grooves 30 formed in the lateral direction from the longitudinal grooves 20 towards the sidewall 5, the lateral grooves 30 widening in width towards the sidewall 5.

11 Claims, 16 Drawing Sheets

(a)

(b)

Tire with small-expanded lateral grooves

Tire with large-expanded lateral grooves (a)

(b)

(a)

(b)

NOISE-REDUCING TIRE

CROSS REFERENCE TO RELATED APPLICATION

The present application claims priority to Korean Patent Application No. 10-2022-0124172, filed Sep. 29, 2022, the entire contents of which is incorporated herein for all purposes by this reference.

BACKGROUND OF THE INVENTION

Field of the Invention

The present invention relates to a tire for vehicles, and more particularly, to a noise-reducing tire with a noise reduction structure.

Description of the Related Art

During vehicle operation, noise is generated by various factors such as the vehicle's own air resistance, mechanical movements of the drive system such as the engine and transmission, and friction between the tires and the road surface.

Vehicle noise can reduce ride comfort for the driver and passengers and cause the unpleasant sensations, leading to efforts to reduce noise using vehicle soundproofing materials or sound-absorbing materials.

The Korean Ministry of Environment announced the adoption of the tire noise performance labeling system, which has been in effect in the European Union (EU) since 2019, and the domestic and foreign automotive industries are working hard to reduce noise in preparation for the implementation of the system. In the past, the focus was on reducing the noise generated inside the vehicle, such as the engine, but there is an increasing trend of applying new low-noise technologies to tire development from the early stages in order to minimize the noise generated outside the vehicle, such as tires.

Especially electric vehicles, which have been rapidly increasing in market share in recent years, require different noise performance for tires than internal combustion engine vehicles. The absence of an engine in electric vehicles leads to lower overall noise levels, resulting in a higher contribution of tire and road surface friction noise, thereby increasing the importance of tires.

The pipe resonance peak in the 1 kHz frequency range and the pitch noise generated by pitch blocks divided in the driving direction, contribute significantly to the overall tire noise. When in contact with the ground, a pipe-like shape is formed, and as impacts are applied to each block, noise is generated in the form of pipe resonance at the 1 kHz frequency range and impact noise associated with the frequency range related to the number of pitch blocks.

Conventional tires typically have more lateral grooves to facilitate drainage. The lateral grooves formed on the tires become another source of noise due to the impacts when they come into contact with the ground.

DOCUMENTS OF RELATED ART (Patent Document 1) Japanese Patent Publication No. 2019-529230 (2019 Nov. 17)

SUMMARY OF THE INVENTION

The present invention has been conceived to solve the above problems, and it is an object of the present invention to provide a noise-reducing tire capable of minimizing the unpleasant noise generated between the road surface and the tire by reducing the noise energy in such a way as to reduce the pipe resonance peak associated with and affected by pitch noise through reduction of the noise energy generated in the lateral grooves.

In detail, it is an object of the present invention to provide a noise-reducing tire capable of mitigating noise by reducing noise energy in such a way as to narrow the air channels and disperse the contact mechanism with the road surface through the design of lateral grooves with lateral expansion sections and lower step portions.

In order to accomplish the above objects, the noise-reducing tire 1 according to an embodiment of the present invention includes side walls 5 on both sides, a tread portion 10 connecting the outer circumferences of the side walls 5, longitudinal grooves 20 formed in the tread portion 10 along the driving direction, and lateral grooves (LG) 30 formed from the longitudinal grooves 20 towards the side walls 5 in the lateral direction, wherein the lateral grooves 30 expands in width towards the side walls 5.

The lateral grooves 30 may be formed to communicate with the longitudinal grooves 20 at the ends thereof on the side of the longitudinal grooves 20.

The lateral grooves 30 may be formed with a lateral expansion section 50 that expands in width in a stepwise manner, including one or more sidewall steps 51 on one or both sidewalls.

The sidewall steps 51 formed in the length direction (X-direction) of the lateral groove 30 each widen sequentially in width within a range of 0.01 mm to 0.1 mm, relative to the width of the lateral groove 30.

The sidewall steps 51 may be configured with a tapered profile, narrowing towards the side of the longitudinal grooves 20 and widening towards the side walls 5.

The lateral groove 30 is formed to communicate with the longitudinal groove 20 at the ends on the side of the longitudinal groove 20, and the depth of the lower surface of the lateral groove 30 is configured to be shallow on the side of the longitudinal groove 20 and deep on the side of the side wall 5, with respective to the surface of the tread portion 10.

The lateral groove 30 may be configured to include a lower surface step portion 40 with one or more lower surface steps 41 gradually deepening towards the side wall 5, while communicating with the longitudinal groove 20 at the ends on the side of the longitudinal groove 20.

The lower surface of the sidewall steps 41 may have a slope gradually deepens from the side of the longitudinal groove 20 to the side of the side wall 5.

The lateral groove 30 may communicate with the longitudinal groove 20 at an end thereof on the side of the longitudinal groove 20 and include tie bars 14 and 15 protruding in the circumferential direction of the tire on the side of communication end, connecting the sidewalls of the tread pattern blocks 11 at a lower height than the tread portion 10.

The lateral groove 30 may further include one of a non-spaced tie bar 14 connecting the inner walls of the lateral groove 30 without being separated apart from the longitudinal groove 20 and a spaced tie bar 15 connecting the inner walls of the lateral groove 30 while being spaced apart from the longitudinal groove 20.

The non-spaced tie bar 14 or the spaced tie bar 15 may have a shape deepening in a flat surface or a parabolic shape.

DETAILED DESCRIPTION OF THE INVENTION

Figure 1:
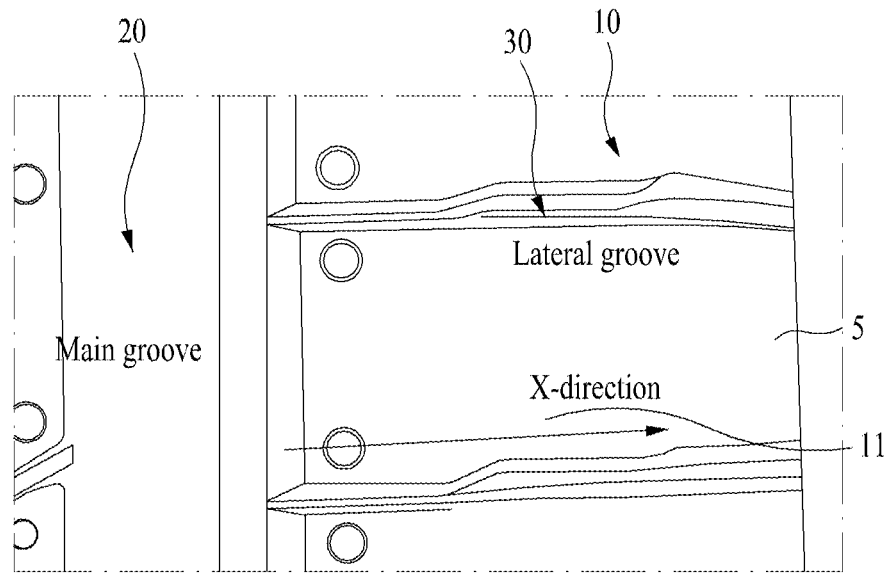
FIG. 1 shows (a) a plan view photograph and (b) a perspective view photograph of the tread portion of a tire with longitudinal and lateral grooves 20 and 30 according to an embodiment of the present invention.
Figure 1:
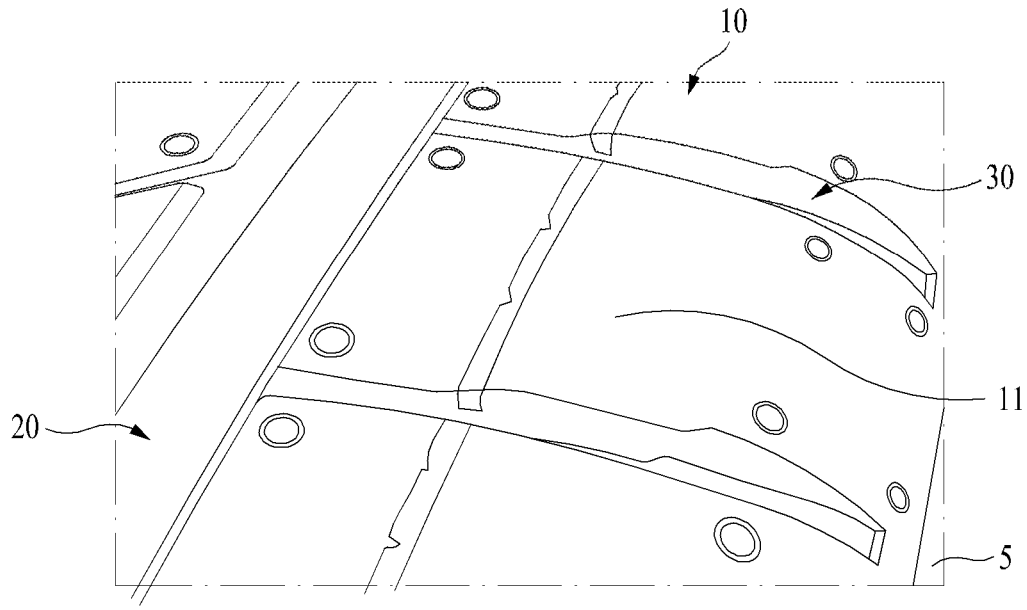

In the following description of the present invention, detailed descriptions of well-known functions and configurations may be omitted to avoid obscuring the subject matter of the present invention.

The embodiments according to the present invention can be subject to various modifications and can take on different forms, and thus specific embodiments are illustrated in the drawings and described in detail in this specification or the application. However, this should not be construed as limiting the embodiments of the invention to specific disclosed form, but rather should be understood to encompass all modifications, equivalents, or substitutes that fall within the scope of the concept and technological scope of the invention.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present. Other expressions that describe the relationship between components, such as "between" and "immediately between" or "adjacent to" and "directly adjacent to" should be interpreted similarly.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Hereinafter, the present invention is described in detail with reference to the accompanying drawings illustrating preferred embodiments of the invention.

Figure 2:
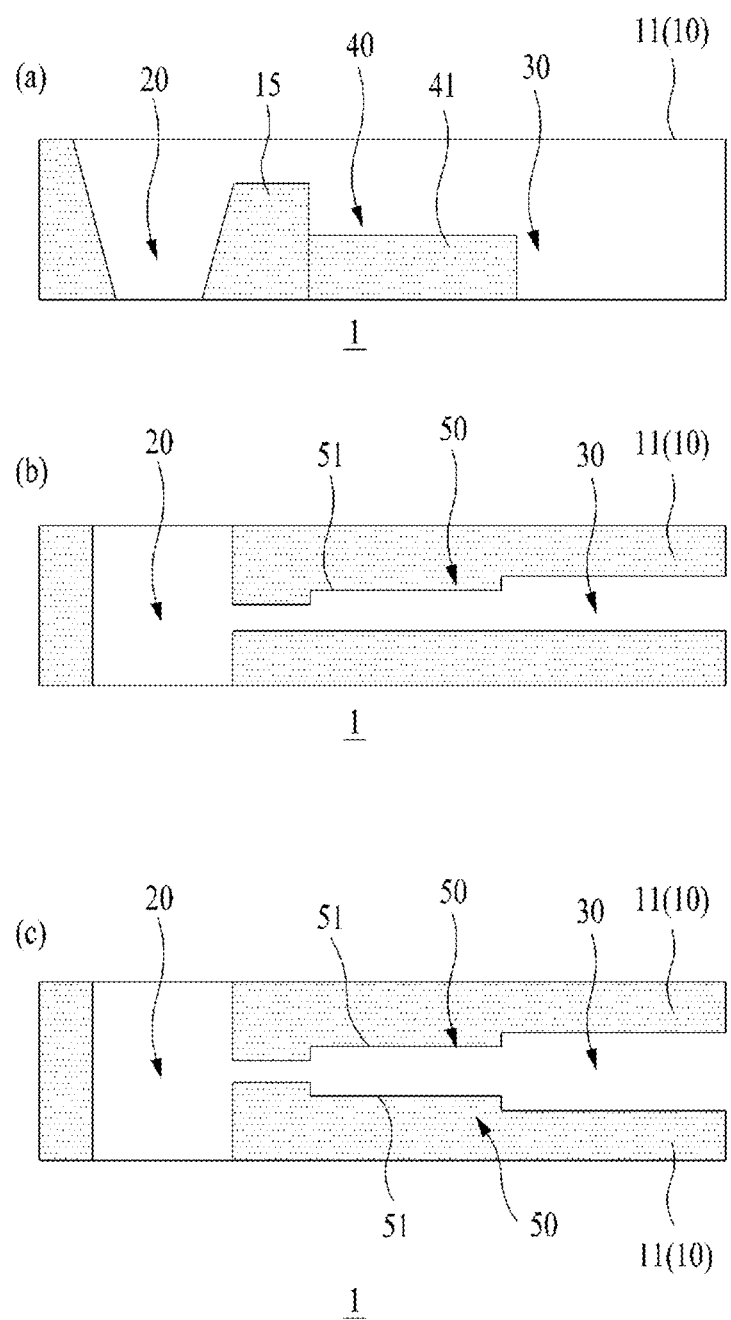
FIG. 2 shows (a) a side cross-sectional view of a tire 1 with a longitudinal groove 20 and a lateral groove 30, (b) a plan view focusing on the longitudinal groove 20 and the lateral groove 30 with a lateral expansion section 50 formed on one sidewall of the lateral groove 30, and (c) a plan view focusing on the longitudinal groove 20 and the lateral groove 30 with lateral expansion sections 50 formed on both sidewalls of the lateral groove 30.

FIG. 1 shows (a) a plan view photograph and (b) a perspective view photograph of the tread portion of a tire with longitudinal and lateral grooves 20 and 30 according to an embodiment of the present invention, and FIG. 2 shows (a) a side cross-sectional view of a tire 1 with a longitudinal groove 20 and a lateral groove 30, (b) a plan view focusing on the longitudinal groove 20 and the lateral groove 30 with a lateral expansion section 50 formed on one sidewall of the lateral groove 30, and (c) a plan view focusing on the longitudinal groove 20 and the lateral groove 30 with lateral expansion sections 50 formed on both sidewalls of the lateral groove 30.

As shown in FIGS. 1 and 2, the noise-reducing tire 1 according to an embodiment of the present invention includes side walls 5 on both sides, a tread portion 10 connecting the outer circumferences of the side walls 5, longitudinal grooves 20 formed in the tread portion 10 along the driving direction, and lateral grooves (LG) 30 formed from the longitudinal grooves 20 towards the side walls 5 in the lateral direction, wherein the lateral grooves 30 are characterized by expanding in width towards the side walls 5.

The lateral grooves 30 may be formed to communicate with the longitudinal grooves 20 at the ends thereof on the side of the longitudinal grooves 20.

The lateral grooves 30 may be formed with a lateral expansion section 50 that expands in width in a stepwise manner, including one or more sidewall steps 51 on one or both sidewalls.

The sidewall steps 51 may be configured with a tapered profile, narrowing towards the side of the longitudinal grooves 20 and widening towards the side walls 5.

The sidewall steps 51 of the lateral grooves 30 may be configured with multiple steps in the X-direction, such as first step, second step, third step, and so on.

The number of steps in each sidewall step 51 along the length direction (X-direction) of the lateral groove may be set so that the width of the sidewall step 51 is sequentially increased by 0.01 mm to 0.1 mm, compared to the width of the lateral groove 30 at the connecting part of the longitudinal groove 20.

Considering the length direction (X-direction) of the lateral groove, the criterion for setting two or three steps is that the lateral groove width expands by 0.01 mm or more compared to the width of the main groove at the connecting part.

In the above configuration, the height difference between adjacent sidewall steps 51 may be formed within a range of 0.5 mm to 4 mm.

The variation points of the expansion shape and step shape of the sidewall steps 51 may be freely changed according to the size of the lateral groove 30. When the expansion shape and step shape are combined, the optimal positions of the sidewall steps 51 should consider the tread width (TW) of the contact patch of the actual tire, for example, in the case of a 3-step configuration, the starting point of the second step should align with approximately 90 to 95% of the tread width during straight driving, and the starting point of the third step should align with approximately 100 to 105% of the tread width during appropriate cornering.

The lateral groove 30 is formed to communicate with the longitudinal groove 20 at the ends on the side of the longitudinal groove 20, and the depth of the lower surface of the lateral groove 30 is configured to be shallow on the side of the longitudinal groove 20 and deep on the side of the side wall 5, with respective to the surface of the tread portion 10.

The lateral groove 30 may be configured to include a lower surface step portion 40 with one or more lower surface steps 41 gradually deepening towards the side wall 5, while communicating with the longitudinal groove 20 at the ends on the side of the longitudinal groove 20.

In the above configuration, the height difference in the height direction between adjacent lower surface steps 41 may be formed within a range of 0.5 mm to 4 mm.

The lower surface of the sidewall steps 41 may be configured to have a slope gradually deepens from the side of the longitudinal groove 20 to the side of the side wall 5.

The lateral groove 30 may communicate with the longitudinal groove 20 at the ends thereof and include tie bars 15 that protrude in the circumferential direction of the tire on the connected end side, connecting the sidewalls of the tread pattern blocks 11 at a lower height than the tread portion 10.

The lower surface 31 of the lateral groove 30 is not limited to the steps but may also be formed as a flat portion or a sloping surface such as a parabolic surface with a varying slope, as described later with reference to FIG. 5.

Additionally, the sidewalls of the lateral expansion section 50 of the lateral groove 30 are not limited to the steps but may also be formed as straight lines with a predetermined angle relative to the lateral centerline toward the side walls 5 of the tread portion 10, as described later with reference to FIG. 3.

The noise-reducing tire 1 according to an embodiment of the present invention is configured, as described above, to have sidewall steps 40 on the depth direction of the lateral grooves 30 that function as drainage channels and lateral expansion sections 50 on the cross-section in the driving direction of the tread portion 10, thereby reducing pitch-related noise through the dispersion of impact of the lateral grooves 30 when contacting the road surface as well as reducing the generation of noise during straight-line driving.

FIGS. 3 to 7 are diagrams illustrating the experimental results of the noise reduction performance of the noise-reducing tire 1 according to an embodiment of the present invention.

Figure 3:
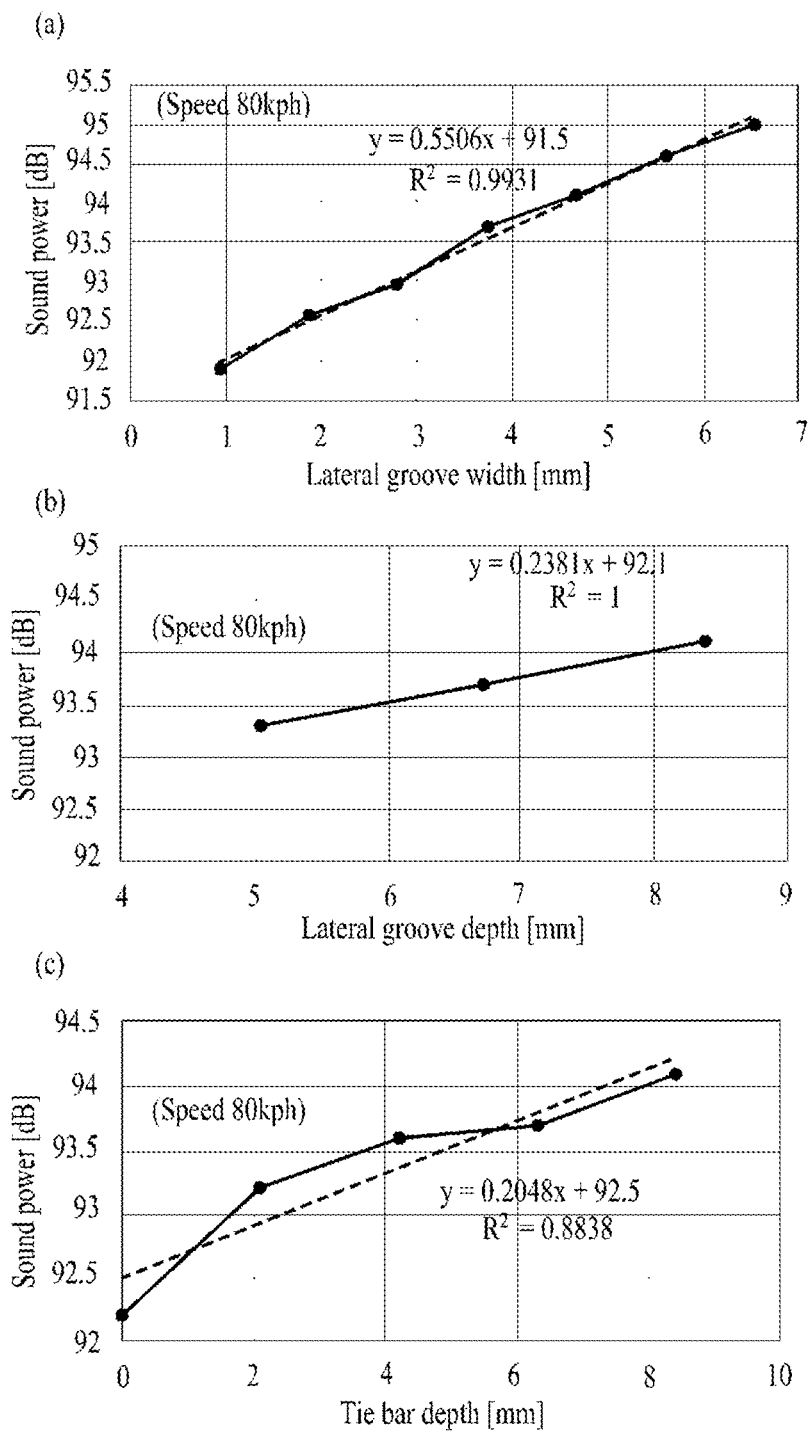
FIG. 3 shows the graphs representing the results of experiments conducted to observe the variations in sound power based on the width and depth of the lateral grooves and the depth of the tie bar of the tire during driving at a speed of 80 kilometers per hour (kph): (a) a graph representing the change in sound power with respect to the width of the lateral grooves, (b) a graph representing the change in sound power with respect to the depth of the lateral grooves, and (c) a graph representing the change in sound power with respect to the depth of the tie bars of the tire.
Figure 4A:
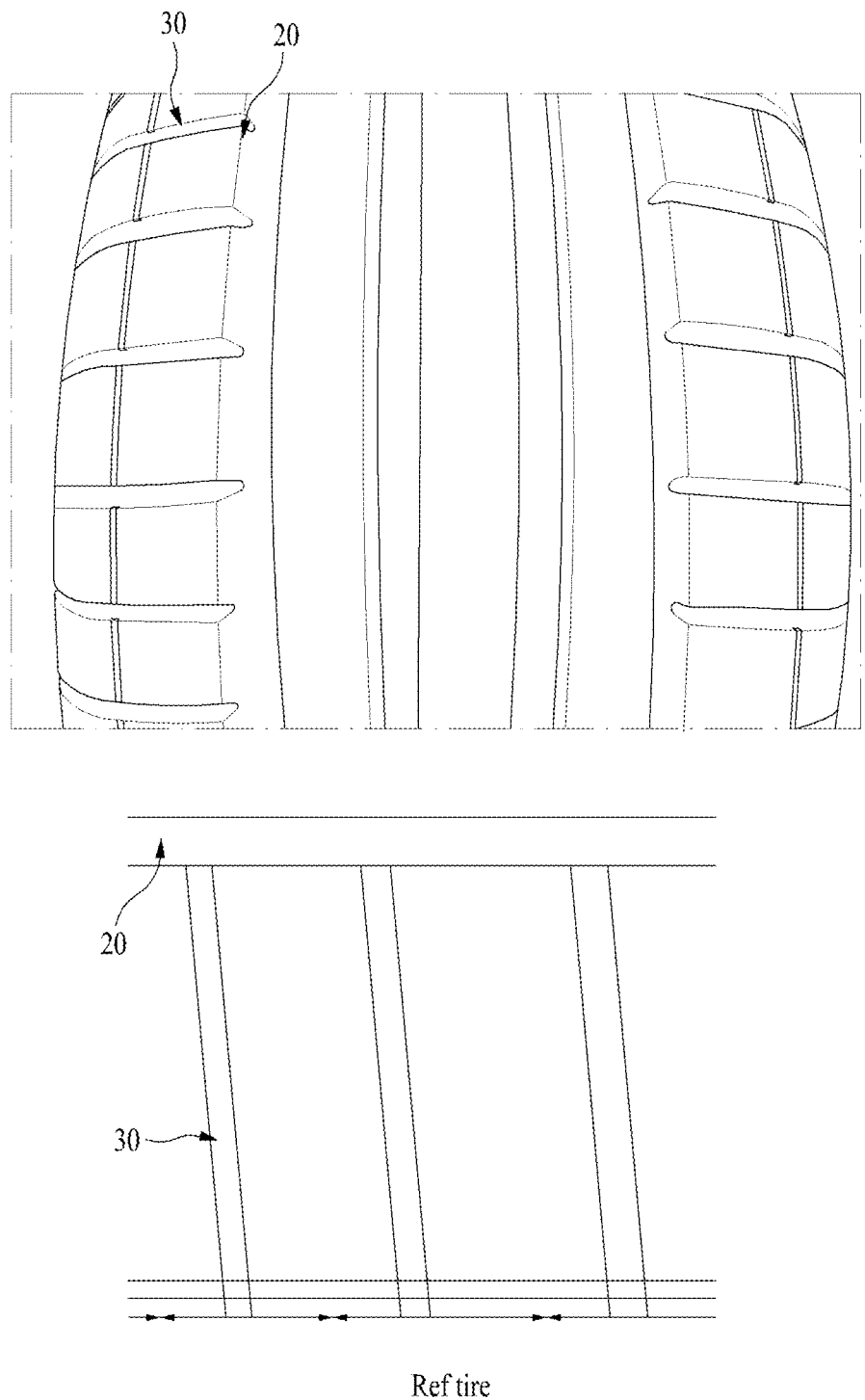
FIGS. 4A-4E show photographs of tires subjected to experiments and the graphs representing the results of experiments conducted to observe the changes in sound power based on the variations in the width of the lateral grooves of the tire during driving at a speed of 80 kilometers per hour (kph): (a) a photograph of a reference (Ref) tire of which lateral grooves have the same width on the side of the longitudinal groove and the side of the side wall, (b) a photograph of a tire (Extended LG Small tire) designed with lateral grooves of which the width increases in such a way as for the width on the side of the side wall to be equal to or wider than 1.5 times and narrower than 2 times the width on the side of the longitudinal groove, (c) a photograph of a tire (Extended LG Large tire) designed with lateral grooves of which the width increases in such a way as for the width on the side of the side wall to be equal to or wider than 2 times and equal to or narrower than 6 times the width on the side of the longitudinal groove, (d) a graph representing the sound power difference for the Ref tire, Extended LG Small tire, and Extended LG Large tire, and (e) a graph representing the sound power change in ⅓ octave band for each tire.
Figure 4B:
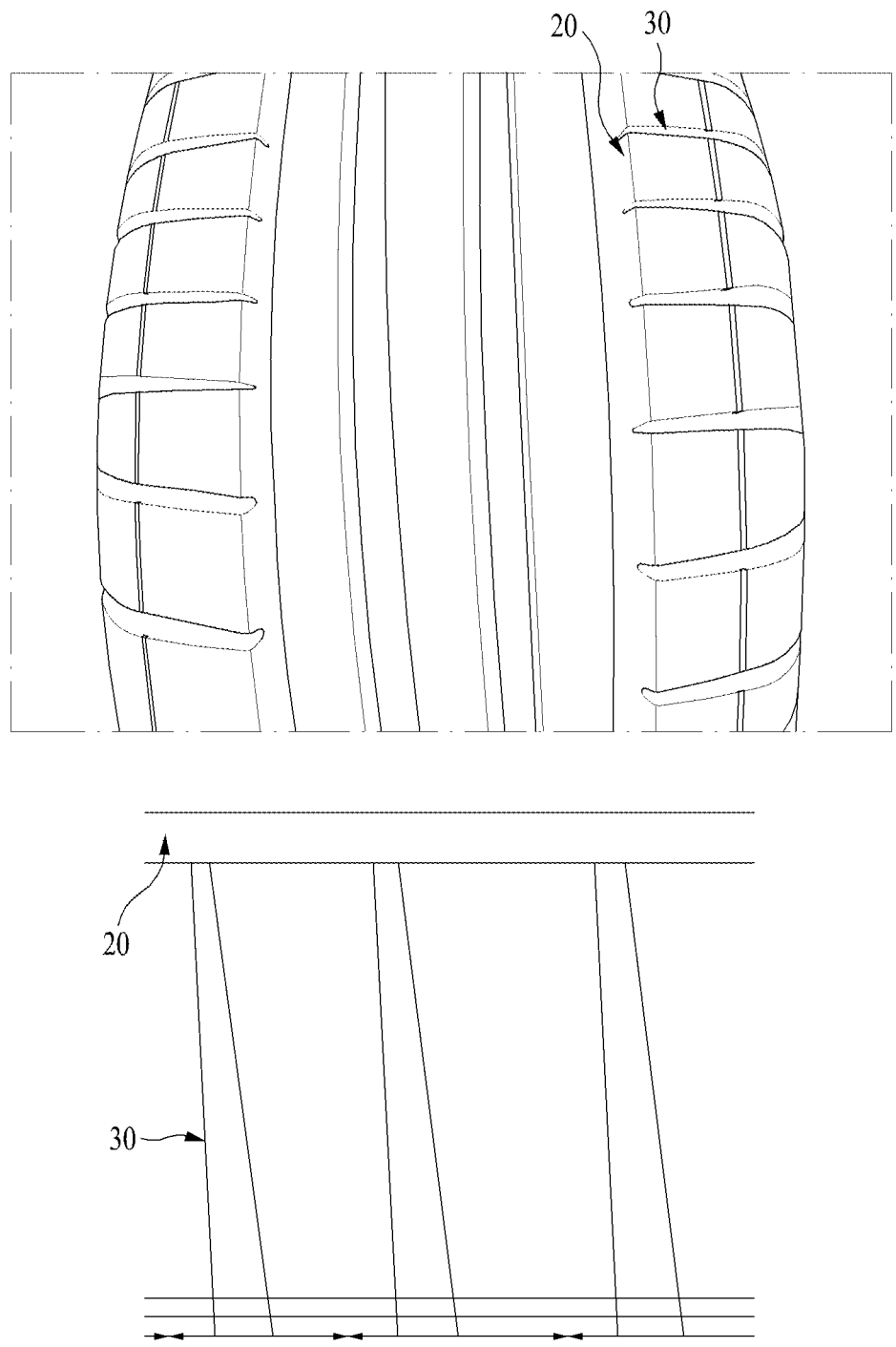
Figure 4C:
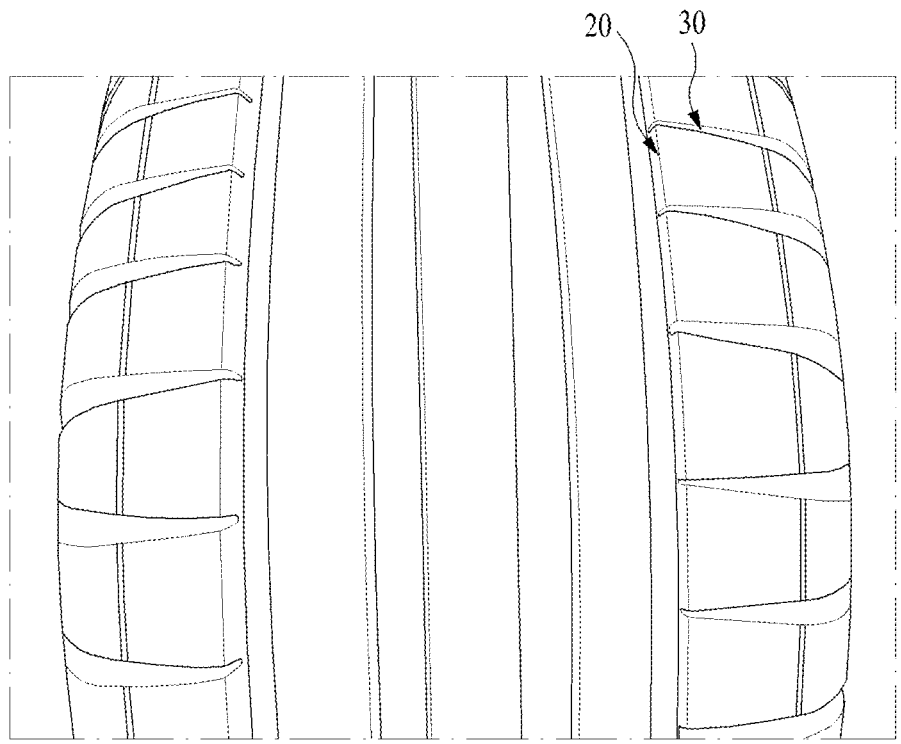
Figure 4C:
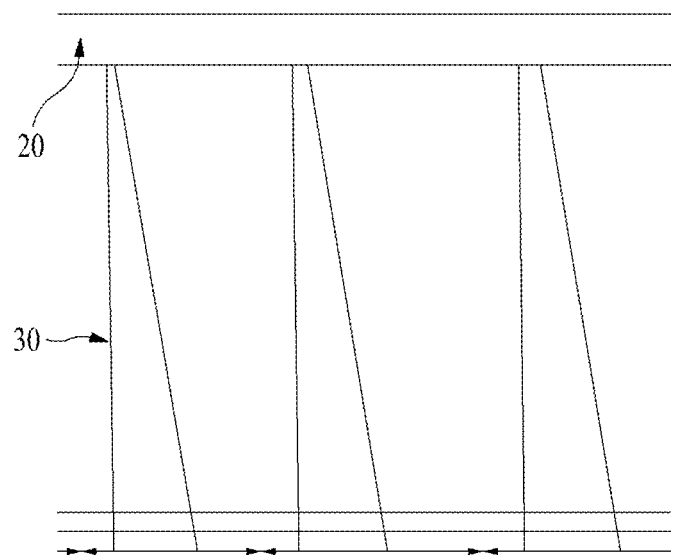
Figure 4D:
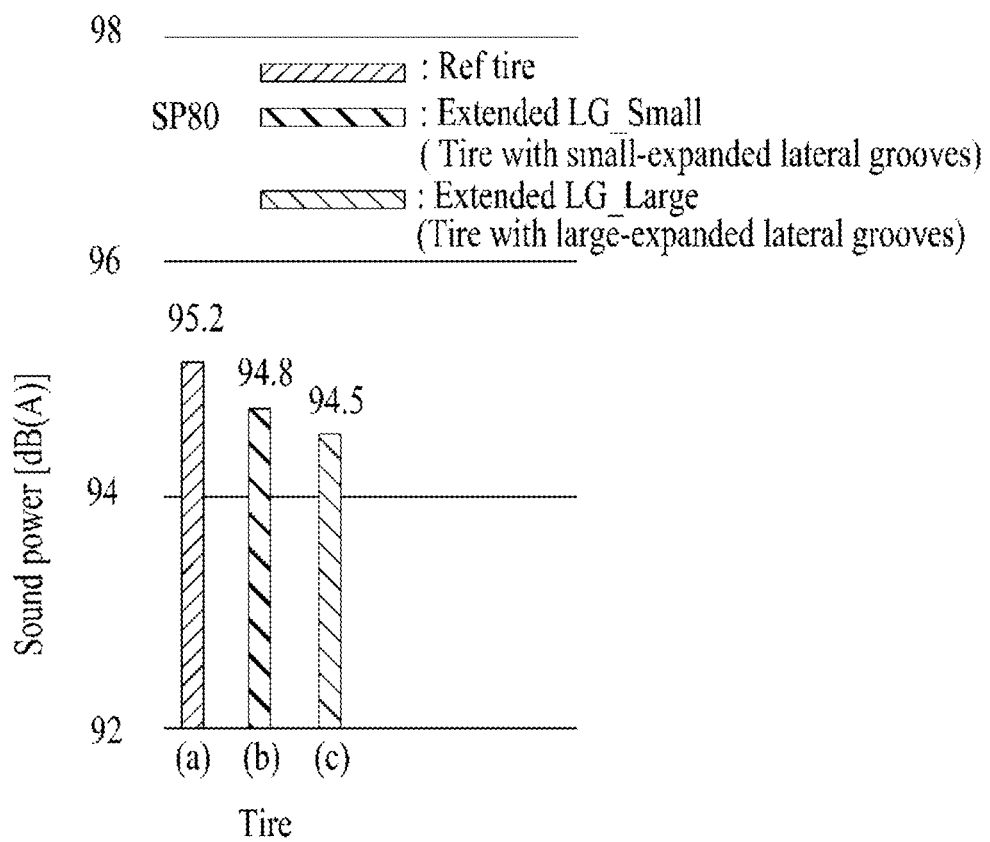
Figure 4E:
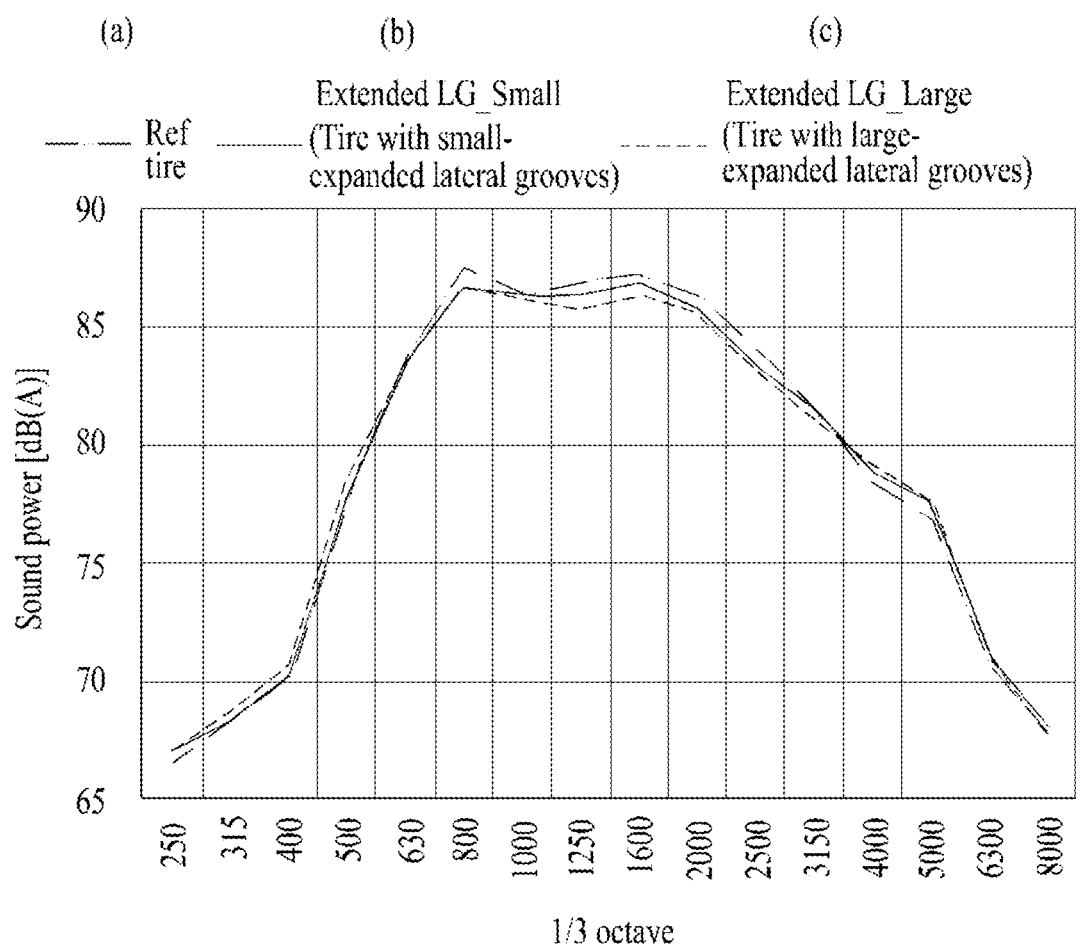
Figure 5A:
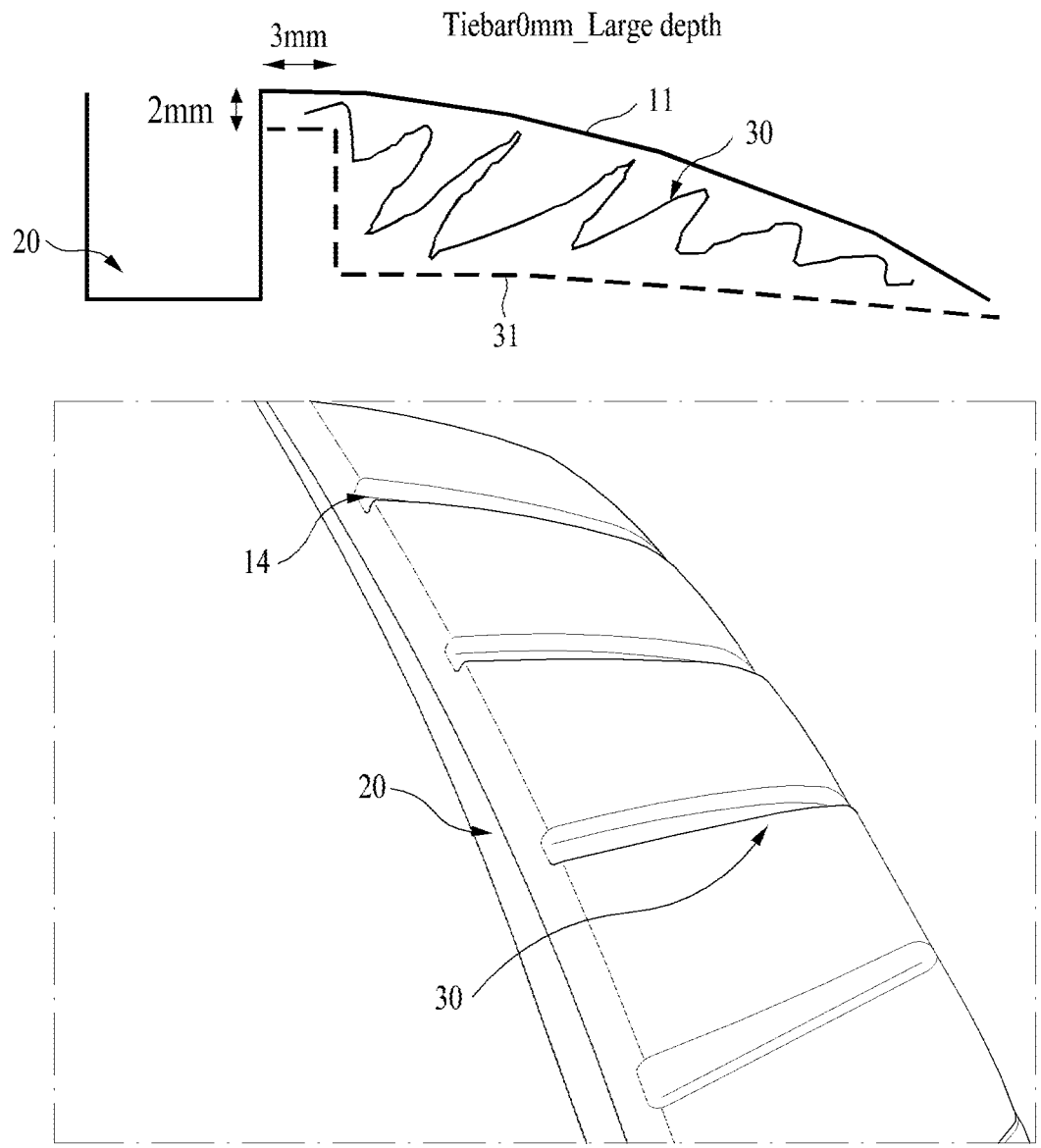
FIGS. 5A-5F are diagrams of tires subjected to experiments conducted to observe the difference in sound power based on the combination of tie bars 14 and 15 and the depth of lateral grooves, during driving at a speed of 80 kilometers per hour (kph): (a) a tire with non-spaced tie bars and large depth lateral grooves (Tiebar0 mm_Large Depth), (b) a tire with non-spaced tie bars and medium depth lateral grooves (Tiebar0 mm_Middle Depth), (c) a tire with non-spaced tie bars and small depth lateral grooves (Tiebar0 mm_Small Depth), (d) a tire with spaced tie bars and large depth lateral grooves (Tiebar3 mm_Large Depth), (e) a tire with spaced tie bars and medium depth lateral grooves (Tiebar3 mm_Middle Depth), and (f) tire with spaced tie bars and small depth lateral grooves (Tiebar3 mm_Small Depth)
Figure 5B:
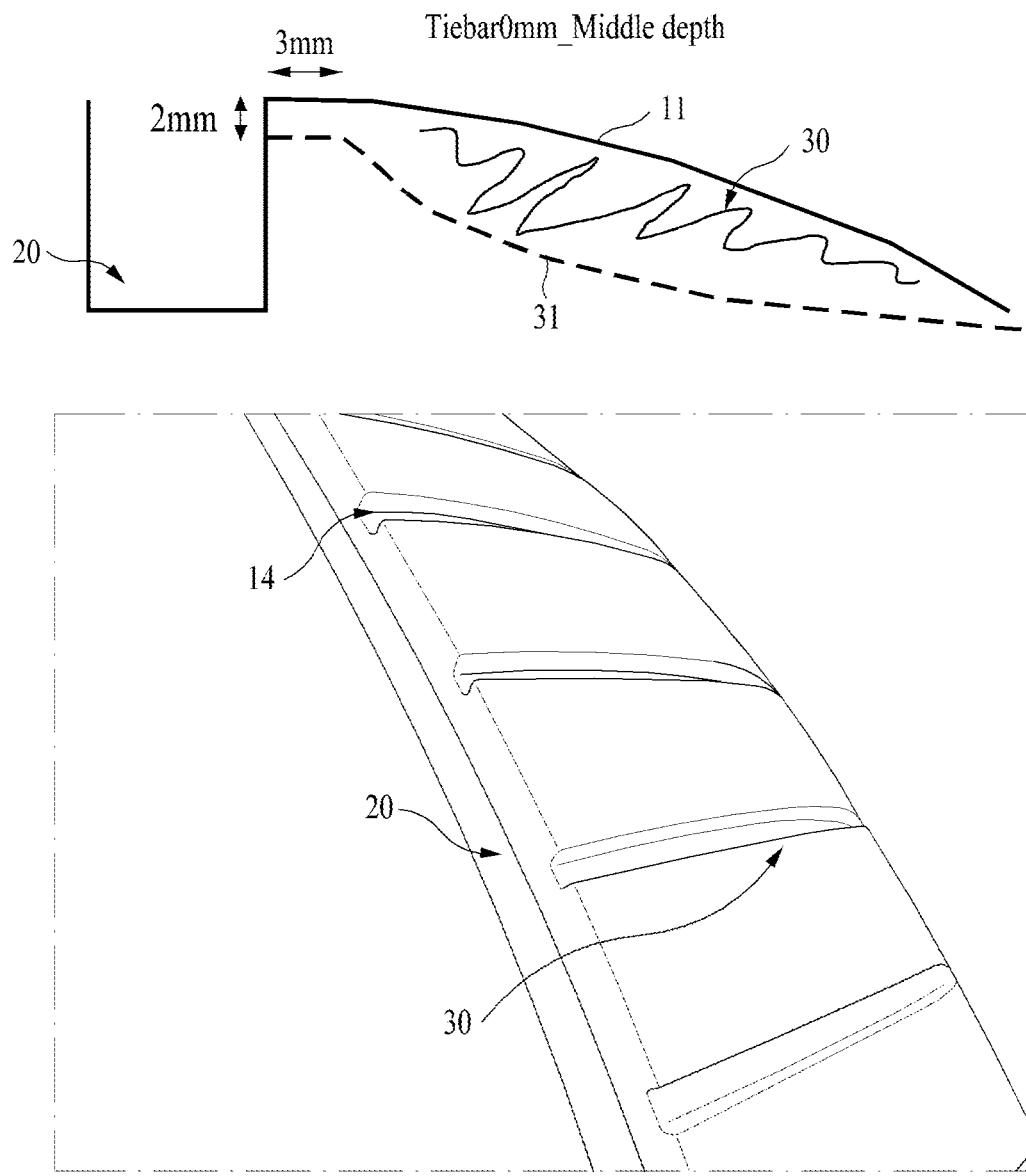
Figure 5C:
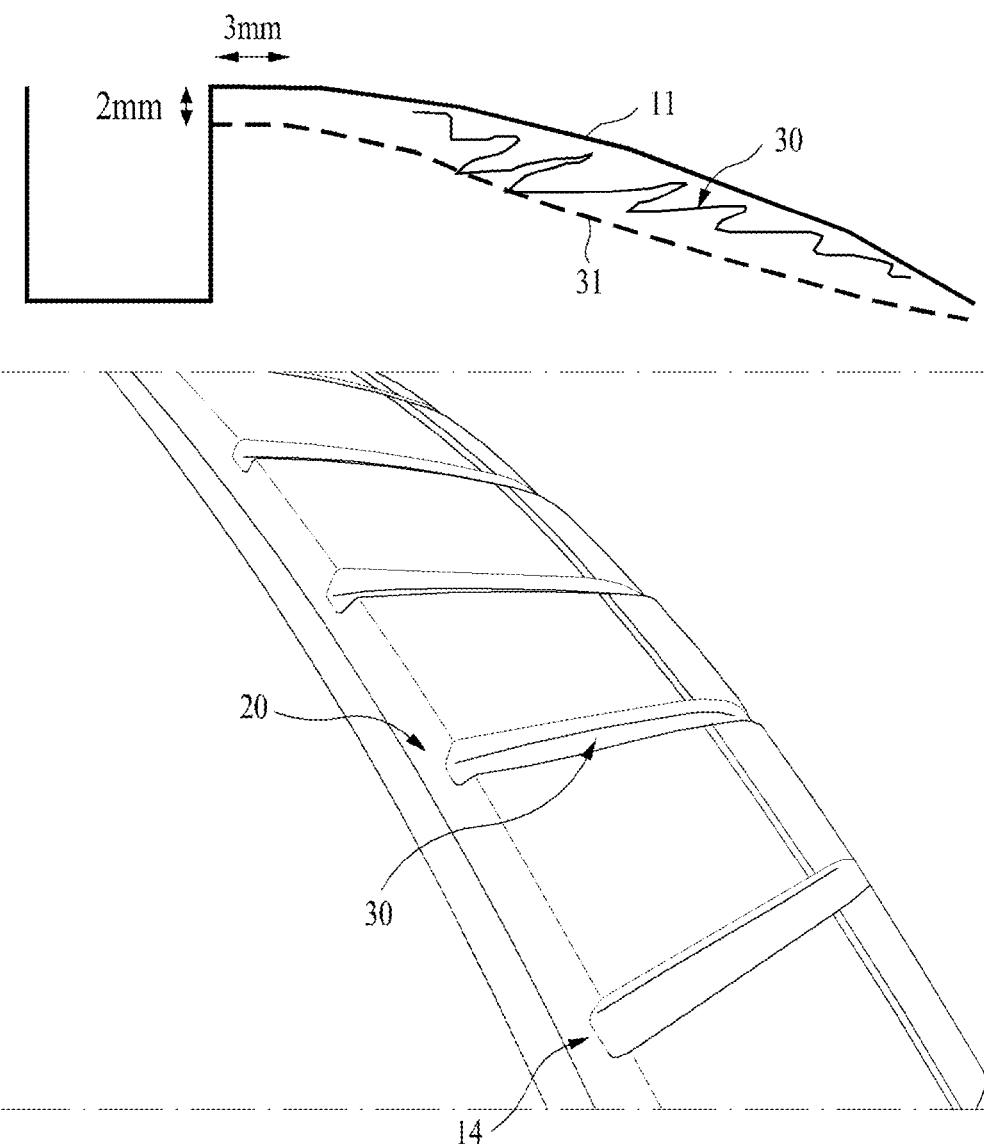
Figure 5D:
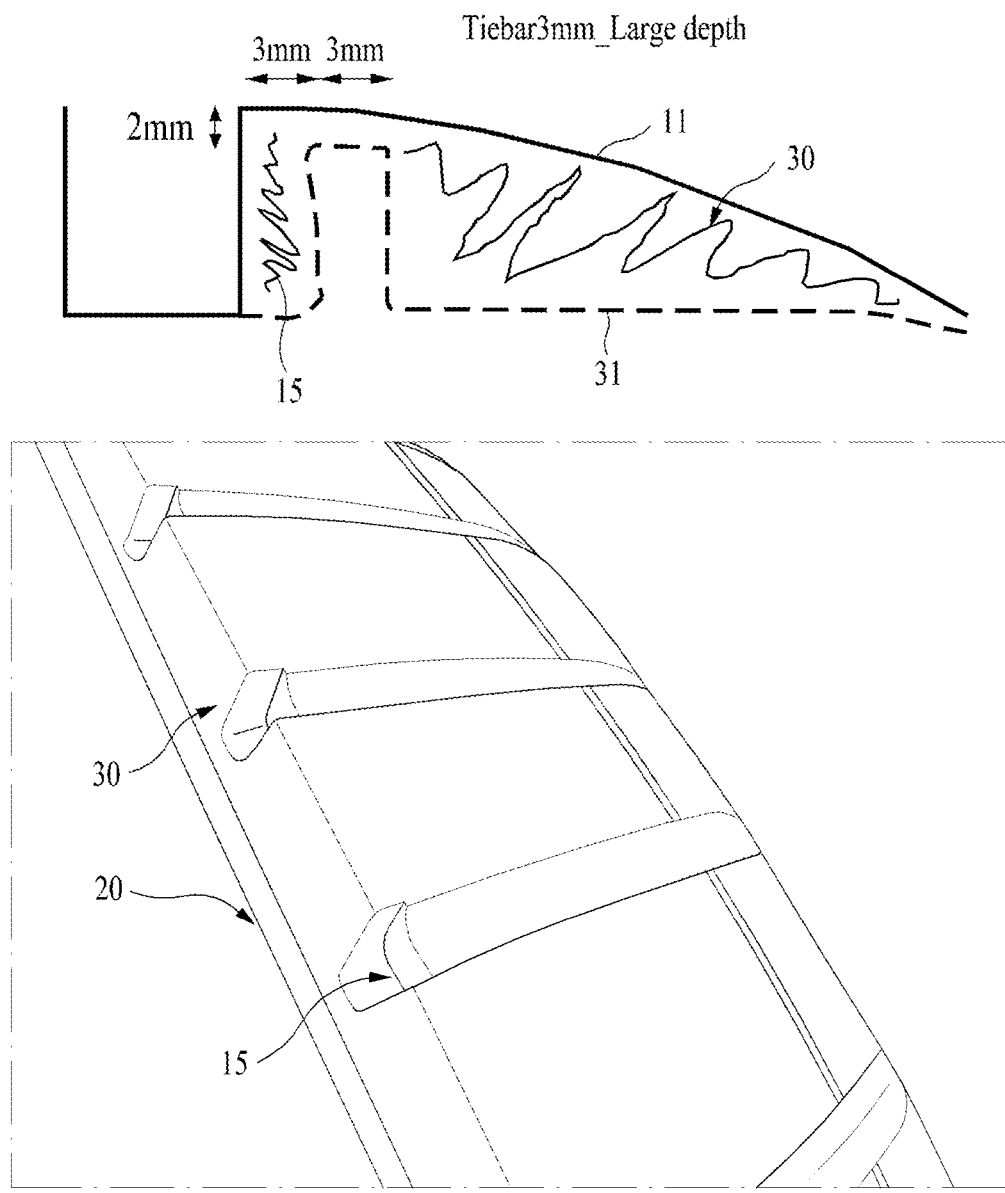
Figure 5E:
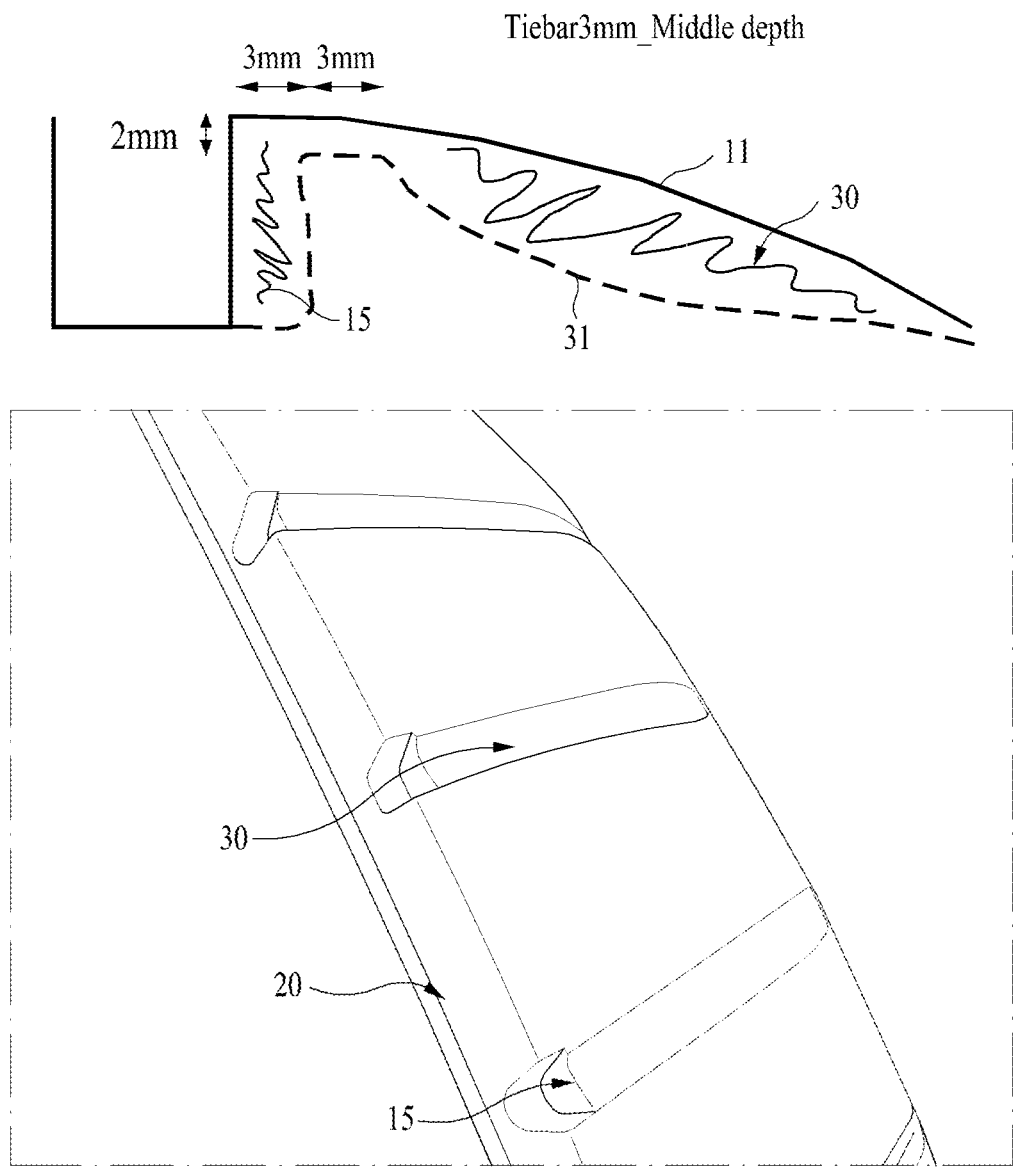
Figure 5F:
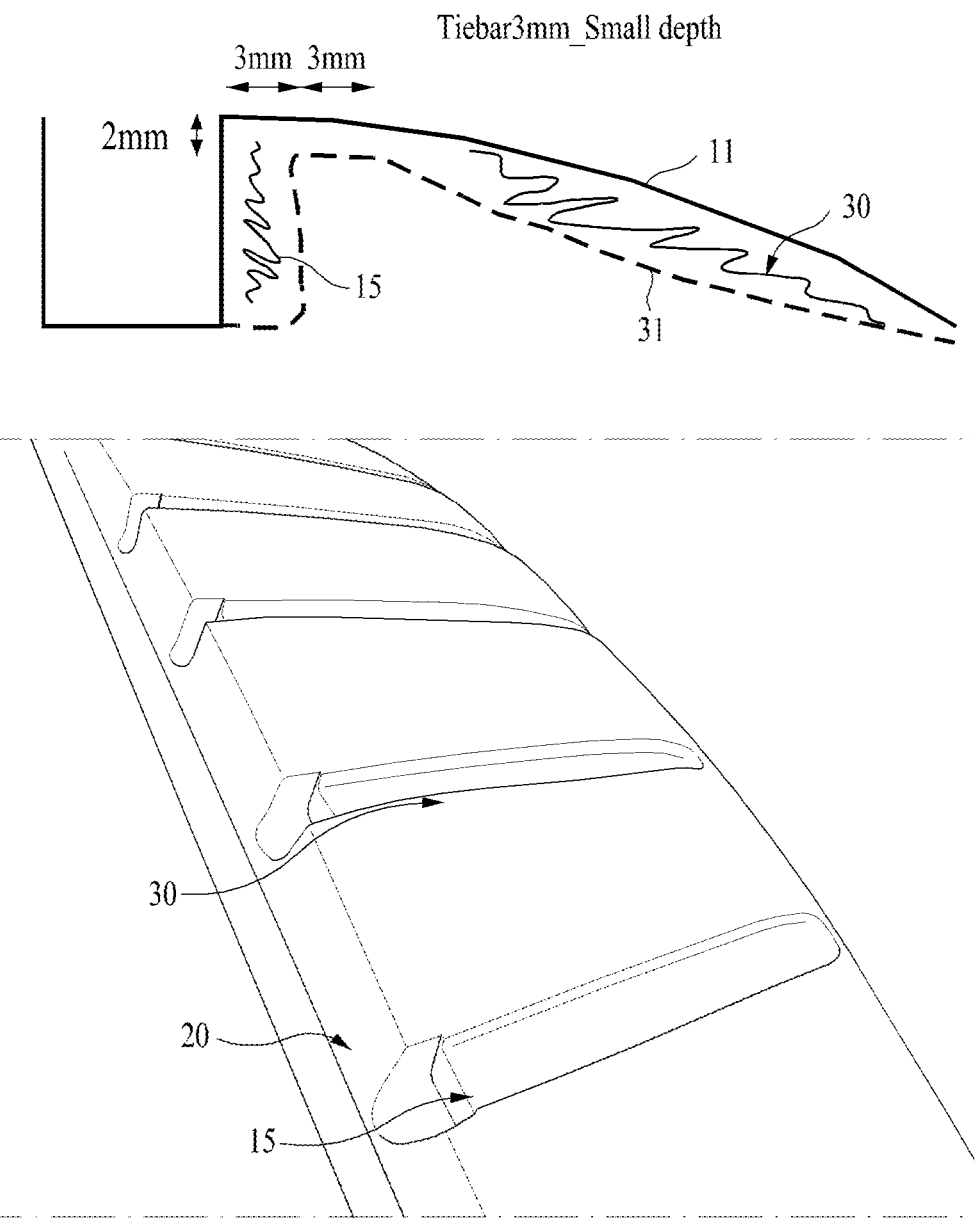

FIG. 3 shows the graphs representing the results of experiments conducted to observe the changes in sound power based on the width and depth of the lateral grooves 30 and the depth of the tie bar 15 of the tire during driving at a speed of 80 kilometers per hour (kph): (a) a graph representing the change in sound power with respect to the width of the lateral grooves, (b) a graph representing the change in sound power with respect to the depth of the lateral grooves, and (c) a graph representing the change in sound power with respect to the depth of the tie bars of the tire.

FIG. 3 shows comparison results of tire noise based on the width, depth, and shape of the lateral grooves 30 and the tie bars 15 in the tire.

In detail, (a) of FIG. 3 is a graph showing the change in sound power of the tire 1 according to the width of the lateral grooves 30, in which the sound power decreases as the width of the lateral grooves decreases.

(b) of FIG. 3 is a graph showing the change in sound power of the tire 1 according to the depth of the lateral grooves 30 in which the tire 1 exhibits better noise performance in terms of sound power as the depth of the lateral grooves decreases.

(c) of FIG. 3 is a graph showing the change in sound power of the tire 1 according to the depth of the tie bars 15 formed on the side of the longitudinal grooves 20 and extending from the upper surface to the tread portion 10, in which the tire 1 exhibits improved noise performance in terms of sound power as the depth of the tie bars 15 decreases.

FIG. 4 shows photographs of tires subjected to experiments and the graphs representing the results of experiments conducted to observe the changes in sound power based on the variations in the width of the lateral grooves of the tire during driving at a speed of 80 kilometers per hour (kph): (a) a photograph of a reference (Ref) tire of which lateral grooves have the same width on the side of the longitudinal groove and the side of the side wall, (b) a photograph of a tire (Extended LG Small tire) designed with lateral grooves of which the width increases in such a way as for the width on the side of the side wall to be equal to or wider than 1.5 times and narrower than 2 times the width on the side of the longitudinal groove, (c) a photograph of a tire (Extended LG Large tire) designed with lateral grooves of which the width increases in such a way as for the width on the side of the side wall to be equal to or wider than 2 times and equal to or narrower than 6 times the width on the side of the longitudinal groove, (d) a graph representing the sound power difference for the Ref tire, Extended LG Small tire, and Extended LG Large tire, and (e) a graph representing the sound power change in ⅓ octave band for each tire.

FIG. 4 shows the results obtained by conducting the experiment with the sidewall steps 51 configured in two steps.

At a driving speed of 80 kph, it was observed that the extended lateral groove small tire (Extended LG Small, as shown in (b) of FIG. 4) and the extended lateral groove large tire (Extended LG Large, as shown in (c) of FIG. 4) provided better noise reduction compared to the regular reference tire (as shown in (a) of FIG. 4). Furthermore, this effect was found to influence the frequency range of 800 to 2500 Hz. Additionally, the reduction in impact noise caused by pitch led to a decrease in overall noise around 1 kHz, confirming the noise reduction effect.

FIG. 5 are diagrams of tires subjected to experiments conducted to observe the difference in sound power based on the combination of tie bars and the depth of lateral grooves, during driving at a speed of 80 kilometers per hour (kph): (a) a tire with non-spaced tie bars and large depth lateral grooves (Tiebar0 mm_Large Depth), (b) a tire with non-spaced tie bars and medium depth lateral grooves (Tiebar0 mm_Middle Depth), (c) a tire with non-spaced tie bars and small depth lateral grooves (Tiebar0 mm_Small Depth), (d) a tire with spaced tie bars and large depth lateral grooves (Tiebar3 mm_Large Depth), (e) a tire with spaced tie bars and medium depth lateral grooves (Tiebar3 mm_Middle Depth), and (f) a tire with spaced tie bars and small depth lateral grooves (Tiebar3 mm_Small Depth).

Figure 6:
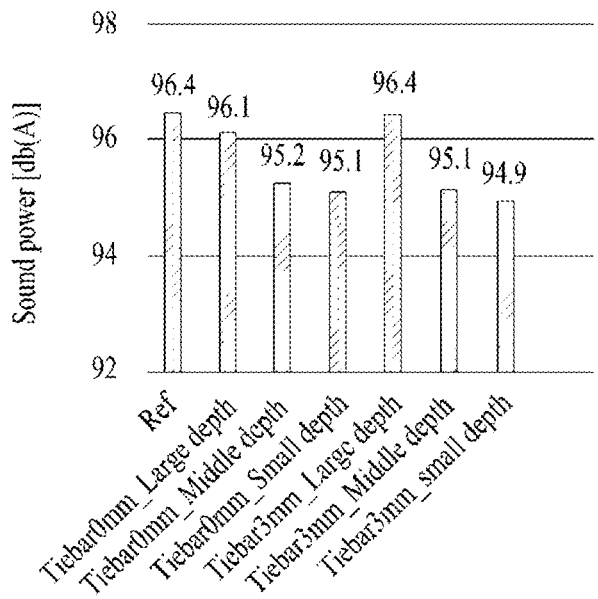
FIG. 6 shows graphs representing the experimental results of sound power difference based on different combinations of tie bars and lateral groove depths in tires during driving at a speed of 80 kilometers per hour (kph): (a) a graph representing the measured sound power values of the tires of FIG. 5, (b) a graph representing the variation of sound power in ⅓ octave bands for the tires of FIG. 5 at the center frequencies.
Figure 6:
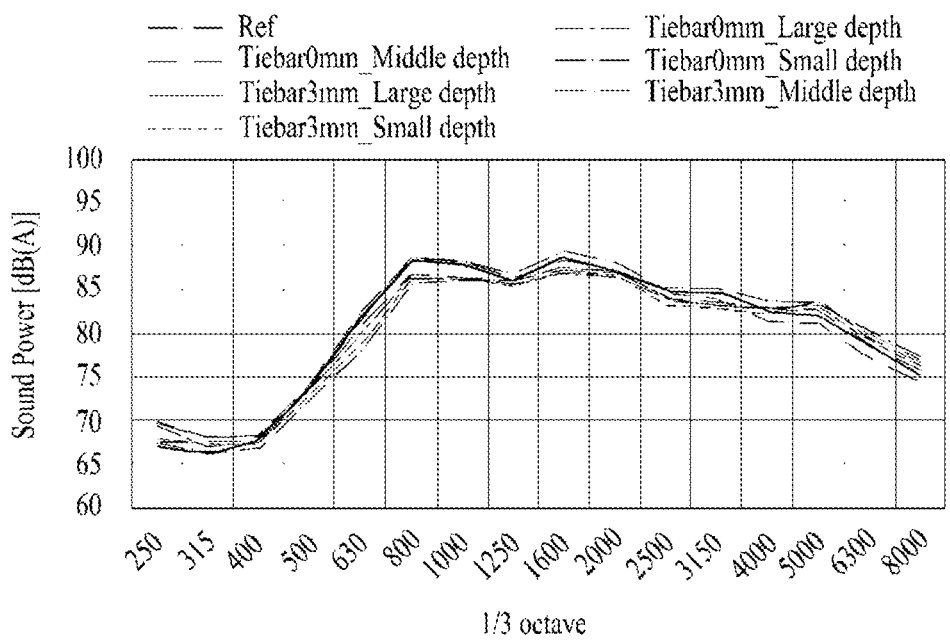

FIG. 6 shows graphs representing the experimental results of sound power difference based on different combinations of tie bars and lateral groove depths in tires during driving at a speed of 80 kilometers per hour (kph), (a) a graph representing the measured sound power results of the tires of FIG. 5, (b) a graph representing the variation of sound power in ⅓ octave bands for the tires of FIG. 5 at the center frequencies.

Figure 7:
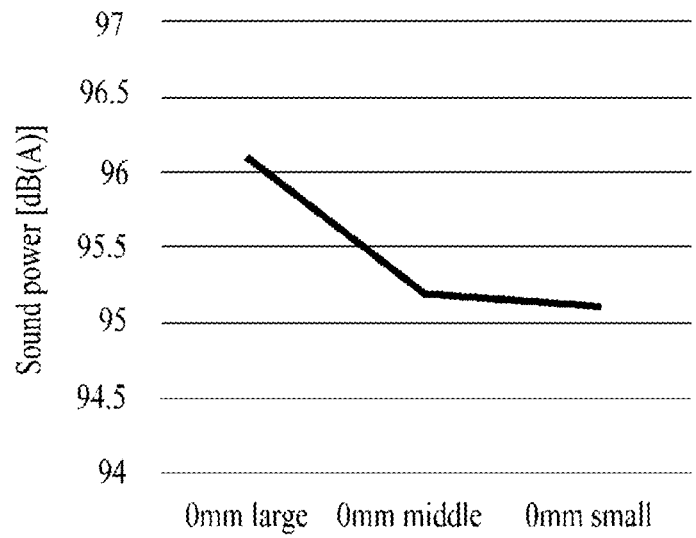
FIG. 7 shows graphs representing the experimental results of sound power variation based on different combinations of tie bars and lateral groove depths in tires during driving at a speed of 80 kilometers per hour (kph): (a) the measured sound power graph for the tires with non-spaced tie bars and large depth lateral grooves (Tiebar0 mm_Large Depth), non-spaced tie bars and medium depth lateral grooves (Tiebar0 mm_Middle Depth), and non-spaced tie bars and small depth lateral grooves (Tiebar0 mm_Small Depth) shown in FIG. 5, (b) the measured sound power graph for the tires with spaced tie bars and large depth lateral grooves (Tiebar3 mm_Large Depth), spaced tie bars and medium depth lateral grooves (Tiebar3 mm_Middle Depth), and spaced tie bars and small depth lateral grooves (Tiebar3 mm_Small Depth) shown in FIG. 5.
Figure 7:
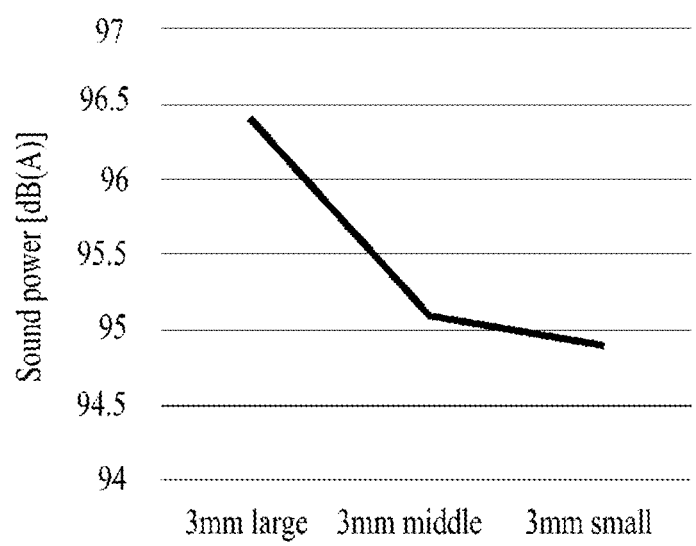

FIG. 7 shows graphs representing the experimental results of sound power variation based on different combinations of tie bars 15 and depths of the lateral groove 30 in tires during driving at a speed of 80 kilometers per hour (kph): (a) the measured sound power graph for the tires with non-spaced tie bars and large depth lateral grooves (Tiebar0 mm_Large Depth), non-spaced tie bars and medium depth lateral grooves (Tiebar0 mm_Middle Depth), and non-spaced tie bars and small depth lateral grooves (Tiebar0 mm_Small Depth) shown in FIG. 5, (b) the measured sound power graph for the tires with spaced tie bars and large depth lateral grooves (Tiebar3 mm_Large Depth), spaced tie bars and medium depth lateral grooves (Tiebar3 mm_Middle Depth), and spaced tie bars and small depth lateral grooves (Tiebar3 mm_Small Depth) shown in FIG. 5.

FIGS. 5 to 7 show the results of experiments on the noise reduction effect of combining tie bar depth and expansion shape based on depth-direction cross-section.

In FIG. 5, non-spaced tie bars 14 refer to tie bars that have no separation from the longitudinal grooves 20, while spaced tie bars 15 refer to tie bars that have a separation from the longitudinal grooves 20. Additionally, the tie bars 14 and 15 may have a flat surface or a parabolic surface that deepens.

The non-spaced tie bars 14 are configured to connect the inner walls of the lateral grooves 30 without being separated apart from the longitudinal grooves 20.

The spaced tie bars 15 are configured to connect the inner walls of the lateral grooves 30 while being separated apart from the longitudinal grooves 20.

The tie bars 14 and 15 may have a starting point positioned on the inner lower surface of the lateral grooves 30 within a range of 0 to 3 mm away from the longitudinal grooves 20.

In (a) of FIG. 5, the tire with non-spaced tie bars and large depth lateral grooves (Tiebar0 mm_Large Depth) is configured with non-spaced tie bars 14 positioned without separation from the lateral grooves 30 of which the low surface has a 2 to 3 mm area located 2 to 3 mm below the surface of the tread pattern 11 on the side of the longitudinal grooves 20 and the remaining area almost equal in height to the lower surface of the longitudinal grooves 20.

In (b) of FIG. 5, the tire with non-spaced tie bars and middle-depth lateral grooves (Tiebar0 mm_Middle Depth) is configured with non-spaced tie bars 14 positioned without separation from the lateral grooves 30 of which the low surface has a 2 to 3 mm area located 2 to 3 mm below the surface of the tread pattern 11 on the side of the longitudinal grooves 20 and the remaining area gradually deepening in a parabolic shape with a maximum depth of approximately 5 to 7 mm from the surface of the tread pattern 11.

In (c) of FIG. 5, the tire with non-spaced tie bars and small depth lateral grooves (Tiebar0 mm_Small Depth) is configured with non-spaced tie bars 14 positioned without separation from the lateral grooves 30 of which the lower surface has a 2 to 3 mm area located 2 to 3 mm below the surface of the tread pattern 11 on the side of the longitudinal grooves 20 and the remaining area gradually deepens in a parabolic shape with a maximum depth of approximately 3 to 4 mm from the surface of the tread pattern 11.

In (d) of FIG. 5, the tire with spaced tie bars and large depth lateral grooves (Tiebar3 mm_Large Depth) is configured with spaced tie bars 15 of which upper surface is formed below the surface of the tread pattern 11, and the lateral grooves of which the lower surface has a 3 mm area below the surface of the tread pattern 11 after the spaced tie bar 15 on the side of the longitudinal grooves 20 and the remaining area having a flat surface with a height almost equal to the height of the lower surface of the longitudinal grooves 20.

In (e) of FIG. 5, the tire with spaced tie bars and middle-depth lateral grooves (Tiebar3 mm_Middle Depth) is configured with spaced tie bars 15 of which upper surface is formed below the surface of the tread pattern 11, and the lateral grooves of which the lower surface has 2 to 3 mm area below the surface of the tread pattern 11 after the spaced tie bar 15 on the side of the longitudinal grooves 20 and the remaining area gradually deepening in a parabolic shape with a maximum depth of approximately 5 to 7 mm from the surface of the tread pattern 11.

In (f) of FIG. 5, the tire with spaced tie bars and small depth lateral grooves (Tiebar3 mm_Small Depth) is configured with spaced tie bars 15 of which upper surface is formed below the surface of the tread pattern 11, and the lateral grooves of which the lower surface has 2 to 3 mm area below the surface of the tread pattern 11 after the spaced tie bar 15 on the side of the longitudinal grooves 20 and the remaining area gradually deepening in a parabolic shape with a maximum depth of approximately 3 to 4 mm from the surface of the tread pattern 11.

The experimental results showed a slight reduction in noise when tie bars 14 and 15 were applied compared to the regular reference tire. In addition, when evaluating with three levels of step formation in the depth direction, clear differences were observed depending on the volume of the lateral grooves 30.

Similar trends were observed when the position of the tie bars 14 and 15 was changed. As shown in (b) of FIG. 6, it was also observed that noise was reduced over a wide frequency range from 630 to 4,000 Hz. When the position of the tie bars 14 and 15 was changed, the same effect was observed depending on the position of the tie bars 14 and 15, confirming that the tie bars 14 and 15 have the noise reduction effect when being spaced from the starting position of the lateral grooves 30 by 0 to 3 mm.

Based on the experimental results of FIGS. 5 to 7, when applying the lateral grooves 30 with sidewall steps 40 and lateral expansion sections 50 on the depth and cross-sections in the driving direction of the tread portion 10, significant noise reduction effects were observed in terms of pattern noise, as well as reducing indoor tire noise and pass-by noise.

With the same contact shape and the same volume of the lateral groove 30, the air pumping noise generated during steady-state driving was reduced as the step difference of the lateral groove 30 increases in the length direction (X-direction, refer to FIG. 1).

The tire 1 configured above according to an embodiment of the present invention can be applied to various vehicles such as racing cars, electric vehicles, and regular vehicles.

The noise-reducing tire according to an embodiment of the present invention is advantageous in terms of minimizing the unpleasant noise generated between the road surface and the tire by reducing the noise energy in such a way as to reduce the pipe resonance peak associated with and affected by pitch noise through reduction of the noise energy generated in the lateral grooves.

The noise-reducing tire according to an embodiment of the present invention is also advantageous in terms of mitigating tire noise by reducing noise energy in such a way as to narrow the air channels and disperse the contact mechanism with the road surface through the design of lateral grooves with lateral expansion sections and lower step portions.

Although the technical concepts of the present invention were described with preferred embodiments, it should be noted that the embodiments are provided for illustrative purpose only and is not intended to limit the scope of the invention. Furthermore, those skilled in the art would understand that various embodiments are possible within the scope of the technical concepts of the present invention. Therefore the true scope of protection for the present invention should be determined by the technical ideas set forth in the attached claims.

DESCRIPTION OF REFERENCE NUMERALS

1: tire
5: side wall
10: tread portion
11: tread pattern block
14: non-spaced tie bar
15: spaced tie bar
20: longitudinal groove
30: lateral groove
31: lateral groove lower surface
40: lower surface step portion
41: lower surface step
50: lateral expansion section
51: sidewall step
Extended LG Small: tire with small-expanded lateral grooves
Extended LG Large: tire with large-expanded lateral grooves
Tiebar0 mm_Large Depth: tire with non-spaced tie bars and large depth lateral grooves
Tiebar0 mm_Middle Depth: tire with non-spaced tie bars and medium depth lateral grooves
Tiebar0 mm_Small Depth: tire with non-spaced tie bars and small depth lateral grooves
Tiebar3 mm_Large Depth: tire with spaced tie bars and large depth lateral grooves
Tiebar3 mm_Middle Depth: tire with spaced tie bars and medium depth lateral grooves
Tiebar3 mm_Small Depth: tire with spaced tie bars and small depth lateral grooves

What is claimed is:

1. A noise-reducing tire comprising:
   side walls on both sides of the noise-reducing tire;
   a tread portion connecting outer circumferences of the side walls;
   a longitudinal groove defined in the tread portion along a driving direction; and
   a lateral groove defined from the longitudinal groove towards one of the side walls in a lateral direction,
   wherein the lateral groove expands in width towards the one of the side walls,
   wherein the lateral groove comprises a lateral expansion section having two or more sidewall steps on at least one of both sidewalls of the lateral groove, the two or more sidewall steps expanding the width of the lateral groove in a stepwise manner towards the one of the side walls of the noise-reducing tire,
   wherein each of the two or more sidewall steps defined in a length direction of the lateral groove increases the width of the lateral groove sequentially within a range of 0.01 mm to 0.1 mm from the lateral groove without the lateral expansion section towards the one of the side walls of the noise-reducing tire,
   wherein the lateral groove includes a tie bar connecting inner walls of the lateral groove, the tie bar being disposed in the lateral groove adjacent to the longitudinal groove,
   wherein the tie bar has a height lower than a surface of the tread portion,
   wherein the lateral groove includes one or more lower surface steps, each lower surface step having a height different from a height of another lower surface step,
   wherein a height of each of the one or more lower surface steps is lower than the height of the tie bar.

2. The noise-reducing tire of claim 1,
   wherein the lateral groove communicates with the longitudinal groove at an end of the lateral groove on a side of the longitudinal groove.

3. The noise-reducing tire of claim 2,
   wherein a width of another end of the lateral groove on a side of the one of the side walls of the noise-reducing tire is 1.5 to 6 times a width of the end of the lateral groove on the side of the longitudinal groove.

4. The noise-reducing tire of claim 1,
wherein the two or more sidewall steps have a tapered profile, narrowing towards a side of the longitudinal groove and widening towards the one of the side walls of the noise-reducing tire.

5. The noise-reducing tire of claim 1,
wherein the tie bar is a non-spaced tie bar connecting inner walls of the lateral groove without being separated apart from the longitudinal groove or a spaced tie bar connecting the inner walls of the lateral groove while being spaced apart from the longitudinal groove.

6. The noise-reducing tire of claim 5, wherein the non-spaced tie bar or the spaced tie bar has a shape deepening in a flat surface or a parabolic shape.

7. The noise-reducing tire of claim 5, wherein the non-spaced tie bar or the spaced tie bar has a starting point positioned on an inner lower surface of the lateral groove within a range of 0 to 3 mm away from the longitudinal groove.

8. The noise-reducing tire of claim 5,
wherein an upper surface of the non-spaced tie bar or an upper surface of the spaced tie bar is positioned 2 to 3 mm below a surface of the tread portion.

9. The noise-reducing tire of claim 1,
wherein the lateral expansion section comprises three steps,
wherein a point of a middle step of the three steps is configured to align with 90 to 95% of a tread width of the noise-reducing tire during straight driving, the point of the middle step being adjacent to another step of the three steps disposed adjacent to the longitudinal groove.

10. The noise-reducing tire of claim 1,
wherein a height difference between adjacent sidewall steps of the two or more sidewall steps is 0.5 mm to 4 mm.

11. The noise-reducing tire of claim 1,
wherein a maximum depth of the lateral groove is 3 to 4 mm from a surface of the tread portion.

* * * * *